Sept. 3, 1968  R. MARKS  3,399,484
BAIT BOX
Filed July 18, 1966
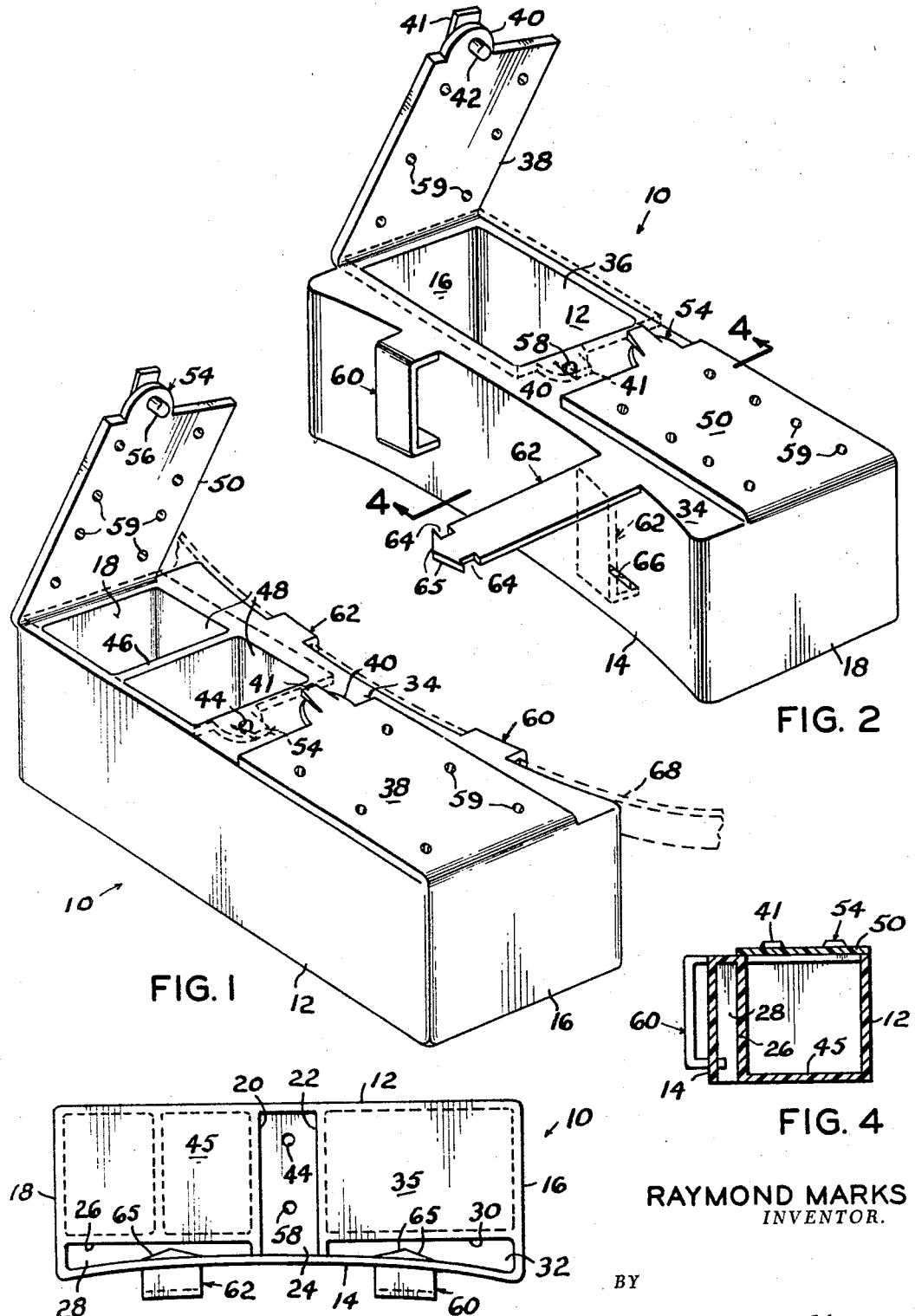
RAYMOND MARKS
*INVENTOR.*
BY
Robert K. Rhea
AGENT United States Patent Office 3,399,484
Patented Sept. 3, 1968

3,399,484
BAIT BOX
Raymond Marks, 1471 Browning Ave.,
Salt Lake City, Utah 84105
Filed July 18, 1966, Ser. No. 565,940
2 Claims. (Cl. 43—55)

ABSTRACT OF THE DISCLOSURE

A rectangular housing, having releasably connected belt engaging loops at one side, is transversely and longitudinally divided by a plurality of partitions to form a pair of upwardly open compartments, an intermediate downwardly open compartment and a pair of downwardly open compartments at one longitudinal side edge. The upwardly open compartments are opened and closed by a pair of lids.

---

The present invention relates to angling and more particularly to a bait box.

It is desirable when fishing with waders or a float-ring to provide a portable fish bait box containing worms, grasshoppers, and the like.

It is, therefore, the principal object of this invention to provide a bait box of this class which may be removably connected with the belt of the user.

Another object is to provide a bait box which is relatively light in weight and is provided with a plurality of bait holding compartments.

Still another object is to provide a bait box wherein partitions form downwardly open compartments for circulation of air to keep the bait cool.

Yet another object is to provide a bait box which is relatively light in weight and economical in construction.

The present invention accomplishes these and other objects by forming a substantially rectangular housing having upwardly open bait containing compartments separated by downwardly open compartments and providing means for attaching the box to a user's belt.

Other objects will be apparent from the following description when taken in conjunction with the accompanying single sheet of drawings, wherein:

FIGURE 1 is a perspective view of the bait box illustrating, by dotted lines, its connection with a user's belt;

FIGURE 2 is a perspective view of the other end and side of the box illustrating, by dotted lines, the manner of connecting one belt loop;

FIGURE 3 is a bottom plan view; and,

FIGURE 4 is a vertical cross-sectional view taken substantially along the line 4—4 of FIG. 2.

Like characters of reference designate like parts in those figures of the drawing in which they occur.

In the drawings:

The reference numeral 10 indicates the box, as a whole, which is substantially rectangular in general configuration having side walls 12 and 14 integrally joined with end walls 16 and 18.

As shown in FIG. 3, a pair of partitions 20 and 22 extend between the side walls 12 and 14 in spaced-apart relation and transversely divide the housing 10. The transverse partition walls 20 and 22, in combination with the side walls 12 and 14, thus form a downwardly open compartment 24 medially the ends of the housing. A longitudinal partition wall 26 extends between the end wall 18 and the transverse partition wall 20 in spaced relation with respect to the side wall 14 thus forming a downwardly open compartment 28. A second longitudinal partition 30 extends between the end wall 16 and transverse wall 22 in spaced relation with respect to the side wall 14 forming a downwardly open compartment 32 at the other end of the housing. A top wall 34, integrally joined to the side wall 14, transverse walls 20 and 22 and longitudinal walls 26 and 30 and extending therebetween, forms the top or cover for the downwardly open compartments 24, 28 and 32. The side wall 12, end wall 16 and partition walls 22 and 30 are joined to a bottom wall 35 to form an upwardly open bait receiving compartment 36. A lid or cover 38 is hingedly connected to the end wall 16 for vertical pivoting movement in opening and closing the compartment 36. A latch comprising an arcuate projection 40 in the plane of the lid and an upstanding thumb lift tab 41 is connected to the free end edge of the lid 38 opposite the hinge. The projection 40 is provided with a depending prong 42 removably received frictionally by a suitable opening 44 formed in the top 34.

The other end portion of the housing has a bait receiving opening, defined by the side wall 12, end wall 18, transverse partition 20, longitudinal wall 26 joined with a bottom wall 45 and transversely divided by a wall 46 to form a pair of bait containing compartments 48 opposite the compartment 36. The pair of compartments 48 are similarly closed by a lid 50 hingedly connected, as at 52, to the end wall 18 and similarly provided at its free end edge with a latch 54 having a prong 56 removably received frictionally by an opening 58 formed in the top wall 34. Each of the lids 38 and 50 are provided with a plurality of apertures 59 forming vent holes for the respective bait holding compartments 36 and 48.

As shown in the drawings, the side wall 14 is arcuately curved longitudinally to partially conform to the belt line of the user. Adjacent its respective ends the upper edge portion of the side wall 14 is provided with integral laterally extending rectangular straps forming loops 60 and 62. The straps are relatively narrow when compared with the width of the box and are provided at their free end portion with opposing indentations or recesses 64 and converging end edges 65 forming an arrow-head-like end portion which removably secures the free end portion of the respective strap with the depending edge portion of the wall 14 by inserting the arrow-head end into a horizontally disposed slot or opening 66 formed in the depending edge portion of the side wall 14, only one of the slots 66 being shown (FIG. 2).

Operation

In operation the bait box compartment 36 is loaded with a desired bait, such as worms while the two smaller compartments 48 are loaded with other type bait, such as salmon eggs, hellgrammites, grasshoppers, bugs and grubs and the lids closed. The belt straps are placed around the user's belt 68 and locked with the side wall 14 as described heiernabove to form the belt loops 60 and 62. This positions the bait box substantially horizontal and permits access to the bait containing compartments by manually lifting the respective latch. The compartments 24, 28 and 32, and vent holes 59 permit circulation of air to maintain a cooler bait box.

Obviously the invention is susceptible to some change or alteration without defeating is practicability, and I therefore do not wish to be confined to the preferred embodiment shown in the drawings and described herein, further than I am limited by the scope of the appended claims.

I claim:

1. A bait box, comprising: a substantially rectangular housing having opposing side and end walls, one said side wall being longitudinally curved arcuately inward; a plurality of partitions dividing said housing and forming upwardly and downwardly open compartments, said plurality of partitions comprising a pair of partitions extending transversely between said side walls to define one said downwardly open compartment centrally of said housing, and aligned longitudinal partitions adjacent one side of said housing extending between said transverse partitions and said end walls, respectively, defining a pair of said downwardly open compartments laterally of said upwardly open compartments; lids opening and closing the upwardly open compartments; and belt loop means comprising a pair of straps connected at one end with the respective upper outer edge portion of said curved wall, said straps each having opposing recesses adjacent its free end and terminating in converging end surfaces outwardly of the recesses, said curved side wall having a pair of recesses removably receiving the free end portion of each said strap.

2. Structure as specified in claim 1 in which said lids are hingedly connected at one end to the respective end of said housing; and latch means securing the lids in closed position, each said latch means comprising, an arcuate projection in the plane of the lid, and a prong connected in depending relation to each said projection, respectively, said housing having an aperture for receiving each respective said prong.

References Cited
UNITED STATES PATENTS

| | | | |
|---|---|---|---|
| 1,354,660 | 10/1920 | Kanthack | 43—55 |
| 2,544,049 | 3/1951 | Sawner | 43—55 |
| 2,800,741 | 7/1957 | Adams | 43—55 |
| 3,315,402 | 4/1967 | Scott et al. | 43—55 |

FOREIGN PATENTS

| | | |
|---|---|---|
| 623,175 | 6/1927 | France. |

HUGH R. CHAMBLEE, *Primary Examiner.*